March 26, 1940. F. T. SNYDER 2,194,574
PROCESS FOR PRODUCING GASOLINE AND GAS
Filed June 14, 1937 2 Sheets-Sheet 1

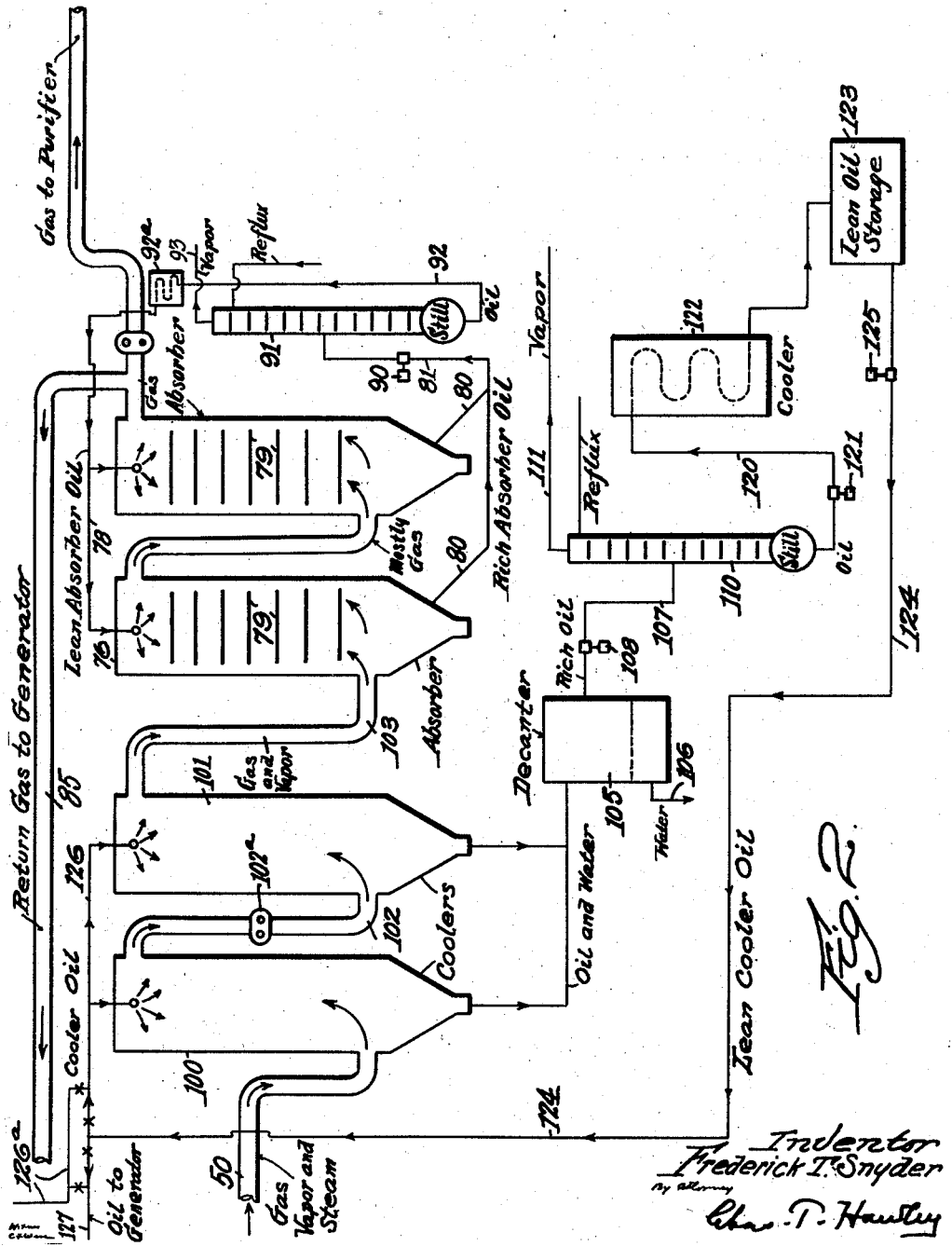

Patented Mar. 26, 1940

2,194,574

UNITED STATES PATENT OFFICE 2,194,574

PROCESS FOR PRODUCING GASOLINE AND GAS

Frederick T. Snyder, Brookline, Mass., assignor to Fuel Research Development Corporation, Boston, Mass., a corporation of Massachusetts Application June 14, 1937, Serial No. 148,168

11 Claims. (Cl. 196—62)

This invention relates to the production of high-grade gasoline and to the simultaneous production of gas for commercial heating or illuminating purposes.

It is the general object of my invention to produce both high-grade gasoline and standard commercial gas by a single combined process which is continuous in operation and which involves the use of highly superheated steam.

A further object of the invention is to provide a continuous gas-producing process in which air gas, water gas, oil gas and coal gas are continuously formed and are successively introduced into the gaseous product, and in which all of said gases are formed and commingled during the process of manufacture in such proportions as to produce commercial gas of standard heating value.

Important features of my invention relate to the initial formation of a large amount of air gas and to the removal and use of a major part of said air gas for highly preheating steam which is thereafter used in the formation of water gas; to the cracking of oil in the presence of coke and at a cracking temperature which is largely produced by said superheated steam; and to the use of a portion of the final or fixed gas to cool and dilute the mixture of water gas, oil gas and superheated steam, thereby effecting distillation of coal gas and coal oils from freshly charged coal at a temperature below its melting or caking point.

My invention further relates to certain arrangements and combinations of parts and to certain ordered procedure which will be hereinafter described and more particularly pointed out in the appended claims.

Apparatus suitable for the carrying out of my improved process is shown in the drawings, in which Fig. 1 is a diagrammatic view of a preferred form of apparatus for carrying out my improved process, with the gas generator shown in sectional elevation; and Fig. 2 is a diagrammatic view of a modified form of apparatus in which oil-spray type coolers are used.

Referring to Fig. 1, my improved process for continuously producing gasoline and gas is preferably carried out in a gas generating apparatus which is similar to a blast furnace in its general construction and which comprises a bosh 10 mounted on a suitable hearth 11, and an upwardly extending stack 12 having usual coal-charging apparatus, such as a bell 14, at its upper end.

Air under pressure is supplied through a bustle pipe 15, supplied with a plurality of tuyères 16 which project through the side wall of the bosh 10 at points spaced about the periphery.

Coal, coke or a mixture of coal or coke with tar or heavy oil is intermittently charged to the generator through the charging bell 14 and is fed gradualy downward by gravity through the stack 12, with successive gas-producing reactions which will be hereinafter described.

When the charged material reaches the burning zone in the bosh 10, it will be substantially in the form of coke, even if it was charged as coal or as a mixture of coal or coke with tar or heavy oil. The air supplied through the tuyère 16 will support combustion of this coke in the burning zone at a temperature, as 3000° F., which is high enough to melt the ash in the coke. This melted ash will then be tapped off from time to time through the spout 17 in the form of liquid slag.

The air gas formed by this combustion of coke consists mainly of carbon-monoxide and nitrogen, mixed with a small amount of carbon-dioxide and other inert gases.

The greater part of the air gas is drawn off through ports 20 and branch pipes 21 which connect with a bustle pipe 22. The pipe 22 is connected by a conduit 23 to the combustion chamber 24 of a stove S which is preferably of the indirect or "recuperative" type and which is continuous in operation. Additional air for the combustion of the withdrawn air gas is supplied to the stove through a pipe 25, and the products of the combustion therein are discharged to a flue or draft apparatus through an outlet pipe 26. A back pressure valve or damper 27 is provided for the pipe 26 and is moved toward closed position by a weight W, adjustable on an arm 28. The burnt gases escape to the flue at a relatively low temperature, such as 600° F.

Low pressure steam is supplied from any suitable source through a pipe 29 to the intake chamber 30 of the stove S and passes through heating tubes 31 to a second chamber 32, from which it is drawn off through a pipe 33 and delivered to a bustle pipe 34 having branch connections to ports 35 in the stack 12 of the generator. These ports are preferably displaced angularly with respect to the outlet ports 10 for the air gas, as clearly shown in the drawings, and are preferably at a substantially higher level.

The steam passing from the stove through the pipe 33 to the generator is highly superheated and may be at 2200° F. or higher. The steam inlet pipe 29 is provided with a check valve 37 for a purpose to be described.

The location of the valves 27 and 37 in comparatively cool parts of the apparatus is quite advantageous.

If the supply of air gas to the stove S is not sufficient to heat the desired amount of steam to a sufficiently high temperature, additional fuel, such as oil or gas from some auxiliary source, may be supplied to the stove S through a pipe 38. If, on the other hand, an excess amount of air gas is generated, the surplus may be drawn off from the annular pipe 22 through a branch outlet 39 for outside disposal.

The temperature in the combustion chamber 24 of the stove S is commonly quite high, as 3000° F., so that any non-combustible dust or ash carried over with the air gas or introduced through the fuel line 38 wil be melted and may be drawn off as liquid slag through a slag spout 40.

Under ordinary operating conditions, the major portion of the air gas is drawn off through the stove S by the flue or draft apparatus, but a minor portion passes up through the stack 12 and is useful in controlling the heat value of the finished gas product. The proportions of air gas passing through the stove and generator may be varied and controlled by adjusting the weight W of the back pressure valve or damper 27.

If for any reason the steam supply is shut off during the operation of the apparatus, the check valve 37 will close. Gas and steam will then flow reversely through the pipe 33 into the steam passages in the stove S, thus balancing the pressure of the combustion gases and preventing leakage of combustion gases into the steam passages.

Oil is supplied to the interior of the mass of highly heated fuel in the stack 12, preferably through one or more oil pipes 42 extending down through the cover plate 43 of the generator and each vertically positioned, as by a set-screw 44. By raising or lowering the pipe or pipes 42, the point of delivery of the oil may be varied for reasons to be hereinafter described. A heater 45 is preferably provided for preheating the oil before delivery in the generator. The pipe 42 is also preferably heat-insulated to prevent cracking of the oil in the pipe 42 before discharge from the lower end thereof.

The highly superheated steam entering the generator through the ports 35 reacts with the heated fuel in the stack 12 to produce substantial quantities of water gas, which gas, with the undecomposed steam and any air gas not withdrawn at 20 for burning in the stove S, flows upward through the coal or coke in the stack and provides the necessary heat for cracking the oil delivered from the pipe or pipes 42 and for producing oil gas, vapors and residual oil therefrom.

As the mixed air gas, water gas, oil gas and surplus steam continue their upward flow through the stack 12, they effect distillation of the freshly charged coal or other fuel, and generate coal gas, coal oil vapors, and other distillation products therefrom.

All of these gases and vapors, including the surplus steam, are drawn out of the stack 12 through a pipe 50 by an exhauster 51 and enter a condenser 52 of the indirect or water-cooled type. The exhauster 51 is preferably placed in the outlet pipe 51ᵃ of the condenser, where the gases to be handled are comparatively clean and cool. The operation of the exhauster 51 is preferably automatically controlled from a pressure indicating device 53 in the air gas connection 23. Any increase in air gas pressure speeds up the exhauster. The control connection is indicated by the broken line 53ᵃ.

As this mixture of gas, vapor and steam passes upward through the condenser 52, the steam is condensed to water which collects in the bottom of the condenser and may be drawn off as indicated at the point 54. By controlling the temperature of the uncondensed gases and vapors leaving the top of the condenser, the high end boiling point of the hydrocarbons passing to the absorbers is controlled, and the hydrocarbons having higher boiling points condense and collect in the receiver in the bottom of the condenser. These hydrocarbons originate in the oil and coal charged to the generator. The condensate may contain hydrocarbons ranging from gasoline to pitch. Those hydrocarbons which are heavier than water settle to the bottom of the receiver where they mix with any coke and coal dust and soot carried over from the generator. The mixture is withdrawn from the extreme bottom of the receiver, as at 55, and may be recharged to the generator or otherwise disposed of.

The condensed oil which is lighter than water is drawn off through the pipe 56 by a pump 57 and may be termed "cycle oil." At this point it is a rich oil containing substantial amounts of low-boiling hydrocarbons or gasoline in solution. This oil is accordingly passed through a still 60, from which the lean oil, now stripped of gasoline, is returned by a pump 61 through a pipe 62 to the oil feed pipe 42 previously described. This oil is then recracked in the generator, usually with the addition of a certain proportion of fresh oil introduced through a pipe 63 and controlled by a valve 64.

The gasoline vapor from the still 60 is withdrawn through a pipe 65, passed through suitable coolers or condensers, and the condensed gasoline is then delivered to storage.

The uncondensed gas and gasoline vapor separated in the condenser 52 is delivered through the pipe 51ᵃ to successive absorbers 76 and 77, indicated as being of the oil-absorption type. Absorber oil is delivered at the top of the absorbers over a series of plates or barriers 79, and is removed from the absorbers through branch pipes 80 and a connecting pipe 81.

This absorber oil is effective in removing substantially all of the gasoline vapor from the product delivered to the absorbers, and the final or fixed gas is then drawn out of the second absorber 77 through a pipe 82 by an exhauster 83 and is passed through the usual purifiers or scrubbers before being placed in storage for commercial use.

A portion of the fixed gas may be returned through a connection 85 and return pipe 86 to the generator, where it is introduced in the upper middle portion of the stack 12, above the oil gas or cracking zone. The function of the return gas is to cool and dilute the ascending gases and vapors in the stack 12, thereby reducing the temperature of the ascending gases below the fusing temperature of the coal and also further reducing the partial pressure of the coal oil vapors, so that they may be distilled at the lowered temperature.

The flow of gas through the return pipe 86 may be controlled by a valve 87, and under certain conditions steam or auxiliary gas may be introduced through a branch pipe 88, controlled by a valve 89. This steam or auxiliary gas may be in addition to or in substitution for the return of gas generated in the system. This return gas may be advanced into the generator 12 by an exhauster 89b.

The absorber oil, rich in gasoline, is delivered by a pump 90 to a still 91 where it is stripped of its gasoline. The lean oil is then returned through a connection 92 and a suitable cooler 92a to the absorber oil supply pipe 78. The gasoline vapor separated out in the still 91 is withdrawn through a pipe 93, passed through suitable condensers, and then delivered to storage.

In the modified construction shown in Fig. 2, the apparatus and method of operation is substantially the same as previously described, except as modified by the employment of oil coolers 100 and 101 in place of the indirect condenser 52 shown in Fig. 1.

The gas generator and connections thereto, including the recuperative stove and steam supply, may be the same as previously described, and the mixed gas, vapor and steam from the generator may be drawn out by an exhauster through the same outlet pipe 50. The pipe 50 in this case connects with the lower part of a cooler 100 which is of the type in which oil is introduced at the top of the cooler in the form of an oil spray. This oil, as it descends, cools the ascending gases and condenses and removes the water and heavier oils. The gases then pass through a down connection 102 to the second cooler 101, from which they are delivered through a pipe 103 to absorbers 79, from which point the treatment of the gas and absorber oil is identical with that previously described in connection with Fig. 1. The exhauster 102a is preferably located in the down connection 102 as shown, or may be in the down pipe 103.

The oil and water removed from the coolers 101 and 102 are collected in a decanter 105, from the lower portion of which the water may be drawn off at 106, and from the upper portion of which the rich oil is drawn out through a pipe 107 by a pump 108. This rich cooler oil is then delivered to a still 110 where it is stripped of its gasoline vapor, which vapor is drawn off through a pipe 111 to suitable condensers and is delivered to storage.

The lean oil, stripped of its gasoline, is removed from the bottom of the still 110 through a pipe 120 by a pump 121. After passing through an oil cooler 122, the lean oil is delivered to an oil storage tank 123, from which it is pumped into a return pipe 124 by a pump 125.

The pipe 124 connects with the supply pipe 126 for the oil coolers 100 and 101, and also connects with a branch pipe 127, corresponding to the pipe 63 in Fig. 1, through which a portion of the lean cooler oil may be delivered to the oil feed pipe or pipes 42. The cooler oil may be supplemented by such fresh oil as is needed.

If the fresh oil is a crude oil containing gasoline, it should be introduced into the pipe 126 through a branch connection 126a, so that the contained gasoline will be recovered in the still 91, as gasoline should not go to the generator for cracking, unless it is desired to convert the fresh gasoline to aromatic gasoline. In that case, or when the fresh oil does not contain gasoline, the fresh oil should be introduced into the pipe 127 through the branch connection 126a. This oil then goes to the generator to be cracked or to be reformed into aromatic gasoline.

The method of operation has been largely indicated in connection with the description of the apparatus but may be briefly summarized as follows:

Assuming that the plant has been in operation long enough to establish normal operating conditions, the bosh 10 of the generator and also the lower middle portions of the stack 12 will be filled with coke, while the upper portion of the stack 12 will contain fresh coal or other fuel fed in through the charging bell 14.

When air is forced in through the tuyères 16, the coke in the base 10 will be consumed and a substantial amount of air gas will be produced.

The major portion of this air gas is drawn off through the recuperative stove S and is burned therein, with or without additional fuel. The pressure in the stove and generator is regulated by the back pressure valve or damper 27.

The superheated steam from the stove S enters the generator through the ports 35 substantially above the point at which the air gas was removed.

This superheated steam, together with a minor portion of the air gas, then passes up through the generator stack 12, and in the lower section of the stack a portion of the steam reacts with the hot coke to form water gas. The steam entering the generator may be superheated to as high as 2200° F. and reacts on the coke to produce water gas.

Thus the introduction of steam from the stove S not only substitutes desirable water gas for inert air gas with its diluting nitrogen but also lowers the temperatures in the furnace substantially below that of the air gas, which is too high for satisfactory oil cracking operations.

The mixture of air gas, water gas and surplus steam then passes up through the middle portion of the stack, or "cracking zone", where the oil and oil vapor engage the hot coke in the presence of the mixture of air gas, water gas and superheated steam. The cracking temperature may be described as intermediate as it is commonly from 1100 to 1400° F. and is between the temperature of 2000° F. at which oil is usually cracked for the production of carburetted water gas and the temperature of 700° to 900° F. at which oil is usually cracked for the production of gasoline.

At this intermediate temperature of, say, 1200° F. and in the presence of the mixed gases previously described, the oil is cracked under such conditions of intermediate temperature and low partial pressure of the oil vapor that both oil gas and gasoline are generated in substantial quantities. Under usual operating conditions, about one-third of the oil by weight is changed to oil gas, one-third to gasoline and the remaining third is carried over as residual oil and is recovered and returned for recracking, as has been described. As a result of this recycling, the yield of gas amounts to 15% to 50% of the weight of the cracked oil, the balance being gasoline. The ratio of gas to gasoline is controlled by regulating the cracking temperature and the time of cracking.

It is found that the cracking operation is satisfactorily performed when the oil is preheated up to 750° F. and is fed to the stack under a low pressure, as 5 lbs.

As the combined air gas, water gas, superheated steam and oil gas moves further upward in the stack 12, fresh coal or other fuel is encountered, from which coal gas, coal oils and other distillation products are distilled and added to the mixture of gases, vapors and steam. The further treatment of these products has been previously described.

The different gaseous components have widely different heating values, air gas commonly having approximately 100 B. t. u., water gas 300 B. t. u., oil gas 1300 B. t. u. and coal gas 600 B. t. u. per cubic foot. A usual requirement for commercial gas is approximately 540 B. t. u. By suitable regulation of my improved generating apparatus and by selective control of the oil and fuel feed and timing, it is found possible to deliver a mixture of gases to the purifiers which has approximately standard heating value, without further modification.

The return of a portion of the fixed gas to the generator through the pipes 85 and 86 is particularly desirable when coal fairly rich in gas and coal oil is being used, as many such coals have a tendency to fuse or cake and clog the generator if the gaseous and liquid components are distilled at a temperature above their fusing point. The introduction of return gas at relatively low temperature, as 60° F., at a point below the fresh fuel and above or near the top of the cracking zone reduces the temperature at which the coal oils are distilled below that at which the coal will fuse or cake. If a non-caking coal or coke is charged to the generator, the use of the return gas may be unnecessary, unless it is desirable for the purpose of reducing the temperature of the gaseous mixture leaving the generator.

A very important feature of my invention resides in the cracking of the oil or oil vapor in the presence of very hot coke and also in the presence of free or nascent hydrogen produced in the generator in the water gas reaction. The carbon which is freed from the oil when cracked is in the form of soot and is deposited on the coke in the cracking zone and this finely divided, free or nascent carbon appears to act as a catalyst in conjunction with the free nascent hydrogen. Under the described conditions as to temperature and low partial pressure of the oil vapor, a large percentage of the hydrocarbons produced are within the gasoline range and it has been found that the gasoline produced is largely aromatic in character and therefore has a high anti-knock rating. With my improved process and apparatus, as much as 80% of the gasoline produced may be of the high anti-knock grade and of corresponding value.

The operating conditions under which the cracking operation is performed, in addition to the fact that only a partial cracking of the oil is necessary, permit me to carry out my process substantially at atmospheric pressure, in contrast to the very high pressure generally employed in other oil cracking processes. This performance of the cracking operation approximately at atmospheric pressure and at high temperature apparently facilitates the formation of aromatic compounds which, for the same boiling point range, require only about one-half the proportionate content of hydrogen, as compared with the paraffin hydrocarbons.

From this it results that heavy oils containing 10% of hydrogen can be cracked by my process with a good yield of high grade gasoline, whereas cracking processes producing largely paraffin gasoline commonly require cracking stocks containing 12% to 14% of hydrogen to obtain a comparable yield of gasoline. Obviously the use of heavier cracking oils, less rich in hydrogen and at lower cost per gallon, makes for economy.

It is found that certain of the coal oil products which distill over under the conditions present in my improved process have the valuable property of keeping the so-called "gum" in the gasoline permanently in solution.

The control of the speed of the exhauster 31 from the pressure indication in the air gas connection 23 causes the exhauster to withdraw substantially all of the mixture of gas, vapor, oil and steam produced in the generator, regardless of changes of resistance in the generator or changes in the quantities of gas, vapor or steam produced in the generator. Increased production, by setting up increased back pressure in the air gas connection, in turn speeds up the exhauster and causes it to remove the larger quantities of the gaseous mixture from the top of the generator.

The normal pressure in the air gas connection is controlled by the setting of the back pressure valve or damper 27, as previously described. By adjusting the weight on the back pressure valve, more or less air gas can be passed upward in the generator, as operating conditions may require.

An outstanding feature of my improved process is its extreme flexibility and adaptability to different operating conditions. By raising or lowering the oil feed pipes, the results of the cracking operation may be widely varied. Generally speaking, the lower the point of delivery of oil into the fuel mass, the more complete will be the cracking operation, as the cracking period is increased. Lowering the oil feed tubes also reduces the time available for the water gas reaction as the relatively cool oil lowers the temperature of the steam below 1800° F. which is about the lower limit for the production of water gas. Consequently by lowering the oil feed tubes, less water gas and more oil gas will be produced, with a richer final or fixed gas product.

Furthermore, the amount of oil gas produced is dependent not only on the time of the reaction but also to a considerable extent on the temperature and pressure in the cracking zone. The cracking temperature results from the amount and temperature of the components of the mixture of superheated steam, air gas, water gas and oil entering the cracking zone. By changing the temperature of any one of these components, the ultimate temperature of the mixture will be changed, with a corresponding change in the cracking reaction.

The temperatures employed in my improved process are relatively high and both the total pressure and the partial pressure of the oil vapor are much lower than in other cracking processes. All of these factors tend to increase the extent of cracking or the amount of oil gas made during a given time period. This time period in my new process is very short, being a matter of a few seconds only, whereas the time in other cracking processes may be as much as a full hour.

The proportions of coal or coke and oil may also be varied in accordance with commercial conditions. If oil is cheaper, the amount of solid fuel may be limited to that required to remove the soot developed in the cracking operation, in excess of that converted into water gas and the necessary additional heat for the stove S may be obtained by feeding oil or gas from storage or elsewhere through the pipe 38 to the stove.

If on the other hand a very heavy oil, such as Bunker C oil, is used for cracking, which oil contains a large amount of carbon to form soot, it will then be necessary to burn larger amounts of coal or coke to remove and consume the increased soot, and a surplus of air gas may thus be produced, which may be drawn off through the connection 39 for generating the steam or for other desired purposes.

The unusual effectiveness of my improved cracking process is due not only to the relatively high temperature and very low partial pressure at which the process takes place, but also to the presence of carbon and hydrogen, both of which are produced directly in the generator in a nascent or highly reactive state.

The application of my invention as it relates specifically to the manufacture of heating and illuminating gas as distinguished from the combined production of both gaseous and liquid hydrocarbons is not claimed herein but forms the subject matter of a divisional application Serial No. 159,539, filed by me August 17, 1937.

Having thus described my invention and the advantages thereof, I do not wish to be limited to the details herein disclosed, otherwise than as set forth in the claims, but what I claim is:

1. The method of conjointly producing gasoline and heating gas which comprises producing air gas by burning at least partly solid fuel in the lower portion of a generator, removing from said portion a major part of said air gas and using said gas to highly superheat steam, introducing said superheated steam to the heated fuel in said generator at a level above the point of removal of said air gas and thereby producing water gas from said steam and heated fuel, introducing oil to said generator above the water gas zone, cracking said oil under conditions of low partial pressure on the oil vapor to change said oil to oil gas and vapors of gasoline and heavier oils, removing the mixed gases, vapors and uncombined steam from the generator, and separating the gasoline vapor and fixed gas from said mixture.

2. In the process of conjointly producing gasoline and heating gas as set forth in claim 1, the feature that the proportion of gasoline to heating gas produced is controlled by changing the level at which the oil is fed to said generator.

3. In the process of conjointly producing gasoline and heating gas as set forth in claim 1, the feature that the mixed gas, vapors and steam are removed from said generator at a rate directly dependent on the pressure of the air gas as removed for superheating steam.

4. In the process of conjointly producing gasoline and heating gas as set forth in claim 1, the feature that additional gas, gasoline and oil vapors are distilled from coal charged to said generator above the cracking zone, and that the vapors resulting from the distillation of the coal mix and condense with the gasoline vapors produced by cracking oil in the cracking zone, whereby the formation of gum in the gasoline is substantially prevented.

5. In the process of conjointly producing gasoline and heating gas as set forth in claim 1, the features that additional gas, gasoline and oil vapors are distilled from said fuel charged to said generator above the cracking zone, and that the partial pressure of the distilled oil vapor is controlled by the return of a portion of the previously separated fixed gas to the generator below the distillation zone.

6. The method of conjointly producing gasoline and heating gas which comprises charging a generator with at least partly solid fuel, producing air gas therefrom in the lower portion of the generator by introducing air and burning a portion of said fuel, removing and using a major part of said air gas to highly superheat steam, introducing said superheated steam to the heated fuel in said generator at a level above the point of removal of said air gas and thereby producing water gas from said steam and said fuel, introducing oil to the highly heated fuel mass in said generator above the water gas zone, cracking said oil at a relatively high temperature, as 1400° F., and under conditions of low partial pressure on the oil vapor to convert said oil to oil gas and vapors of gasoline and heavier oils, cooling and diluting the gaseous mixture in said generator by the introduction of relatively cool return gas to said generator above the cracking zone, distilling gases and oil vapors from the fuel charge above the level of introduction of said cool return gas, removing the mixed gases, vapors and uncombined steam from the generator, and separating the gasoline vapor from said mixture.

7. In the process of conjointly producing gasoline and heating gas as set forth in claim 6, the feature of controlling the proportion of gasoline to heating gas produced by changing the level at which the oil is fed to the highly heated fuel mass.

8. In the process of conjointly producing gasoline and heating gas as set forth in claim 6, the feature that the mixed gas, vapors and steam are removed from said generator at a rate directly dependent on the pressure of the air gas as removed for superheating steam.

9. A process of conjointly producing gasoline and heating gas in a gas generator, which comprises generating air gas from at least partly solid fuel in said generator, removing a major portion of the air gas from the lower portion of the generator, introducing highly superheated steam to the heated fuel in the generator above the point of withdrawal of the air gas, and thereby generating water gas, and thereafter introducing oil to said heated fuel above the water gas forming zone and cracking the oil at a temperature of 1000–1500° F., thereby generating oil gas and gasoline vapor in the presence of a mixture of air gas, water gas and uncombined steam and under conditions of a low partial pressure, removing the mixed gases, vapors and uncombined steam from the generator and separating the gasoline vapor from said mixture.

10. A process as set forth in claim 9, wherein the temperature of the steam, gases, and cracked products is reduced to not substantially more than 900° F. by the admixture of relatively cool return gas with said mixed hot gases and products in the generator at a point above the cracking zone, whereby coking of the solid fuel is prevented.

11. A process as set forth in claim 9, wherein the heat of the air gas removed from the generator is utilized at least in part in producing the superheated steam employed for the production of water gas.

FREDERICK T. SNYDER.